Feb. 18, 1947.  F. L. YERZLEY  2,415,983
SHOCK AND VIBRATION INSULATOR
Filed May 20, 1943  2 Sheets-Sheet 1
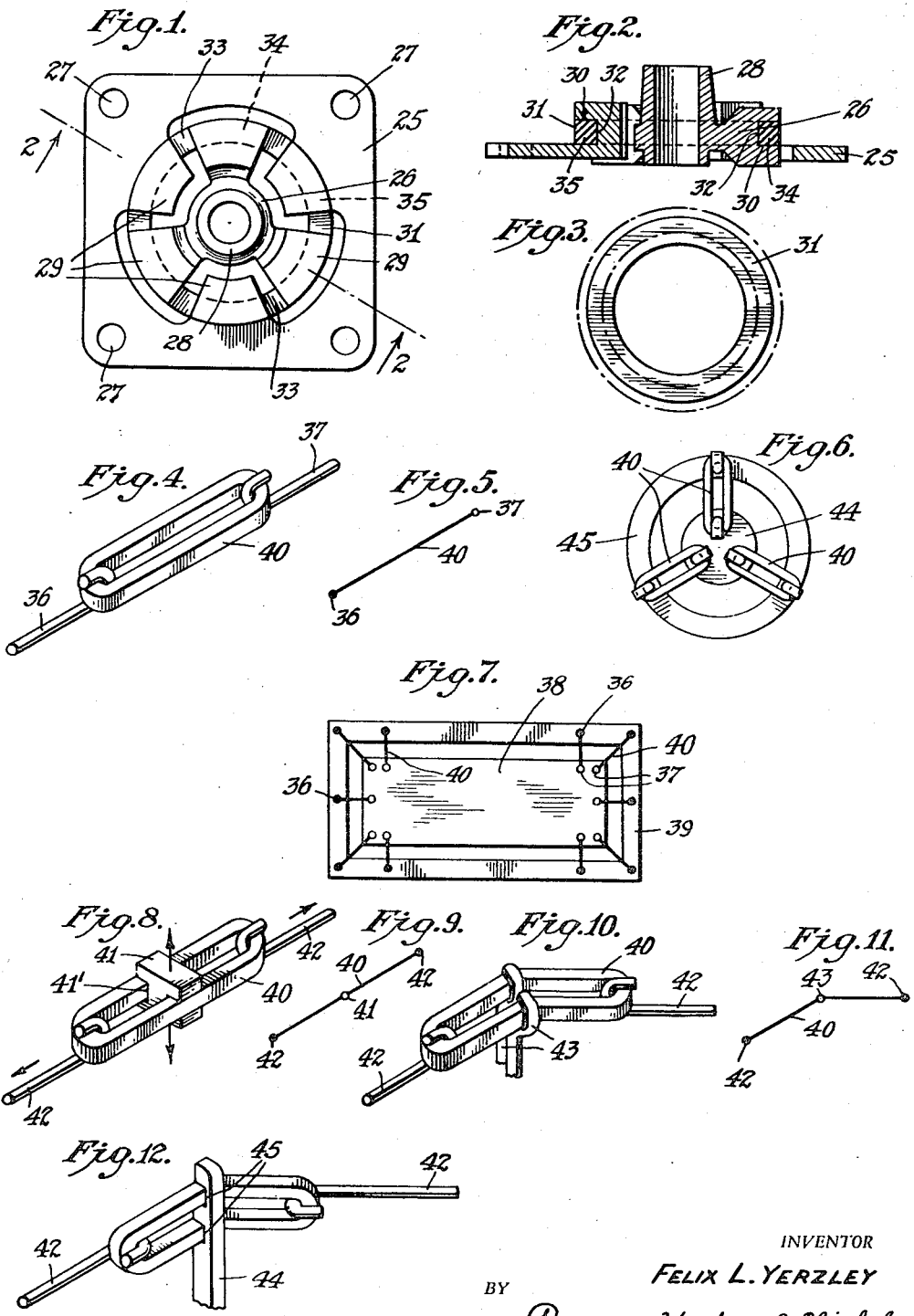
INVENTOR
FELIX L. YERZLEY
BY
Ramsey, Kent and Chisholm
ATTORNEYS Feb. 18, 1947. F. L. YERZLEY 2,415,983
SHOCK AND VIBRATION INSULATOR
Filed May 20, 1943 2 Sheets-Sheet 2
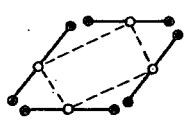
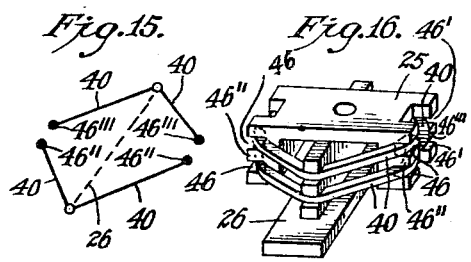
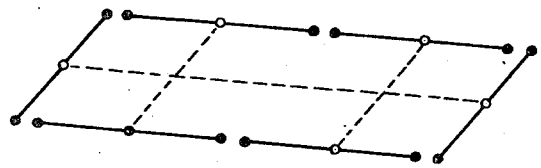
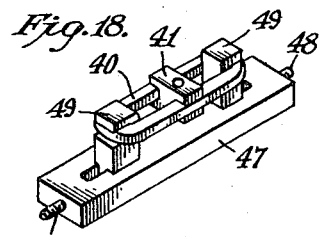
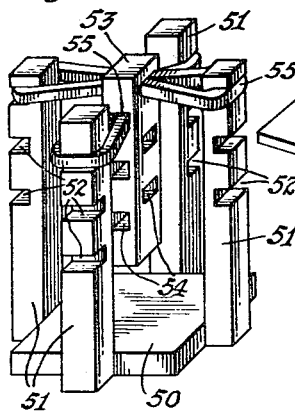
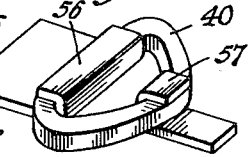
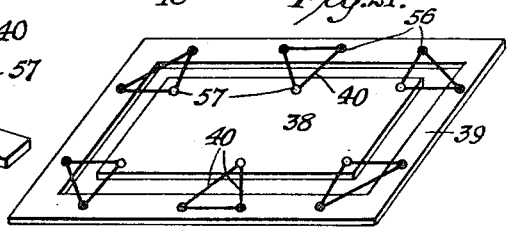
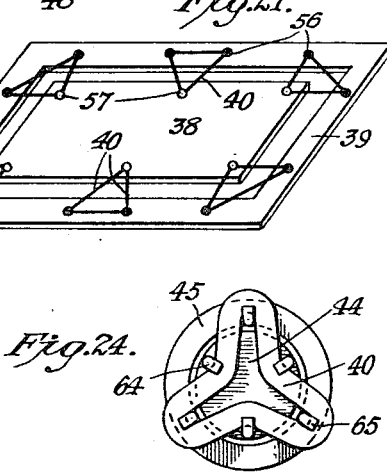
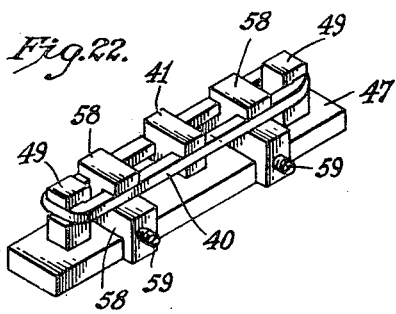
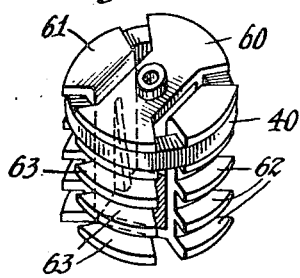
INVENTOR
FELIX L. YERZLEY
BY
Ramsey, Kent and Chisholm
ATTORNEYS Patented Feb. 18, 1947

2,415,983

UNITED STATES PATENT OFFICE 2,415,983

SHOCK AND VIBRATION INSULATOR

Felix L. Yerzley, Newark, N. J.

Application May 20, 1943, Serial No. 487,798

15 Claims. (Cl. 248—358)

This invention is concerned with devices in the nature of shock and vibration insulators, such as may constitute or be parts of the connections between supporting elements on the one hand, e. g., an instrument board in an airplane, and an element carried by such board, e. g., one of the navigation instruments. Devices of this kind are shown and described in my Patent 2,353,952, issued July 18, 1944.

It is an object of the present invention to utilize as I believe, more fully, in the design of devices for the general purposes set forth, the special qualities of rubber that lend themselves to the accomplishment of those purposes. And particularly I aim to utilize the fact that the fatigue life of a length of rubber, normally slack between end supports, if repeatedly subjected to shear deformation stresses by a load applied perpendicular to the length intermediate the supports, will have a relatively short fatigue life, as compared with a similar length that is initially and constantly under tension and in other respects subjected to the same treatment.

Other objects and aims of the invention will appear in the course of the following description, taken in connection with the drawings forming a part thereof.

In the drawings,

Fig. 1 is a plan view of an embodiment utilizing a ring of rubber, much like what is disclosed in my said co-pending application, except that the ring in this case is under initial tension that is maintained within the limits of the operating shear stresses to which it is normally subjected and for which it was designed;

Fig. 2 is a sectional view taken on the line 2—2 of Fig. 1;

Fig. 3 is a view showing in full lines the ring in its unstretched condition before it is engaged in the seats provided for it in the cooperating elements that are connected by it, and showing in dot-and-dash lines how the diameter of the ring has been increased by its normal operating contact with said seats;

Fig. 4 shows in perspective a stretched endless rubber band, with simple hooks for applying tension, one of which hooks, e. g., the one at the left of the figure, is stationary, while the other is movable to put tension and/or shear deformation into the courses of the band, the requisite being that the hooks be at least relatively movable; this constitutes a structural element which becomes useful for my purposes, only when one end is fast to one of two relatively movable members, while the other end is secured to the other of such members (see Figs. 6 and 7).

Fig. 5 is a diagrammatic representation of a spring element such as is shown in Fig. 4, the straight line representing the band of Fig. 4 (or it may be a single stretch of rubber), the black circle at the lower left of the line representing, for example, the stationary hook of Fig. 4, and the light circle at the other end of the line representing the point of application of the force or load causing tension and/or shear distortion in the band or length of rubber;

Fig. 6 illustrates in plan how elements like that of Fig. 4 (three of them are shown) may be utilized to connect two members, here shown as a disk and a surrounding washer-like member, either or both of which are supposed to be movable perpendicularly to the planes of the disk and washer-like members;

Fig. 7 illustrates the application of elements like those suggested in Figs. 4 and 5 to establish a shock and vibration insulating or absorbing connection between an instrument panel and a surrounding frame or the like element to which it is connected or by which it is supported;

Fig. 8 illustrates in perspective an arrangement in which an endless band (or it may be a single stretch of rubber) is kept under tension between two supporting and/or relatively movable hooks or other suitable fastening means engaging the ends of the rubber, and a block is mounted on the rubber intermediate the hooks to which block load or force is applied in the direction or directions of the arrows for bringing about shear deformation in the rubber;

Fig. 9 illustrates in diagram the subject-matter of Fig. 8;

Fig. 10 shows an element derived from Fig. 8; the length of rubber, whether there is a single strip or the parallel courses of an endless band as shown, is bent to give it an angular formation useful in embodiments like Figs. 14 and 15;

Fig. 11 is a diagrammatic representation of the subject-matter of Fig. 10;

Fig. 12 is similar to Fig. 10, except that the courses of the band are disposed one above the other in vertical planes;

Figs. 13 and 17 illustrate in diagram the application of a plurality of Fig. 8 devices to make up a mount for a radio chassis or the like;

Figs. 14 and 15 illustrate in diagram arrangements similar to Fig. 13, made up of elements like Figs. 10 or 12;

Fig. 16 illustrates in perspective an adaptation of the device of Fig. 12, but modified to accommodate a plurality of rubber bands such as shown in Fig. 12;

Fig. 18 illustrates in perspective an adaptation of the Fig. 8 element, with means for regulating the tension of the rubber element;

Fig. 19 is a perspective view showing a variation of the Fig. 8 arrangement whereby the relatively movable elements may accommodate and be connected by a plurality of the rubber connectors arranged vertically one above the other;

Fig. 20 shows in perspective a modified construction of the Fig. 4 element, one of the hooks being much wider than the other, the better to resist lateral displacement of the rubber in the plane of the band;

Fig. 21 is a view similar to Fig. 7 showing a practical application of a plurality of the Fig. 20 elements in making up a panel assembly;

Fig. 22 illustrates in perspective a modification of the devices shown in Fig. 8, which could also be adapted to the structures of Figs. 4, 10, 12, 16, 18, or 19, whereby the effective length of a rubber band or strip may be varied without changing its actual length or overall tension;

Fig. 23 shows in perspective how I can provide a unitary device differing from what is shown in Fig. 19, for obtaining any desired multiplication of the total shock and vibration insulating effect of such a structure as that shown in Figs. 1 and 2; and Fig. 24 is a view similar to Fig. 6, showing how a single band of rubber may be utilized to connect two concentric elements.

Referring to the construction of Figs. 1, 2 and 3, two member to be connected are indicated at 25 and 26. One of these, say 25, may be rigid with (or at any rate connected to), e. g., a supporting base (not shown), as by means of fastening devices passing through holes 27; and the other may have a central tubular part 28 for attachment to a shaft or the like through which a load or force may be transmitted in an axial direction. Each of the members 25—26 provides a plurality of hook- or yoke-like members 29, three for each in this illustration, each hook providing an outwardly opening recess 30 and the hooks being uniformly and symmetrically spaced circumferentially about the axis of the device, which in the illustration would pass centrally through the tubule 28; and collectively the recesses 30 provide in effect a physically discontinuous but functionally continuous circular groove in which is seated a rubber ring 31 that serves as a resilient connector between 25 and 26 and absorbs or damps shock and vibration that might otherwise pass from one to the other if they were not thus mutually insulated. The inner walls 32 of the several hooks are at such radial distances from the axis of the device and so arranged that the functionally continuous outwardly opening groove formed by them presents an inner wall whose diameter is substantially greater than the internal diameter of the ring 31, so that before the ring is engaged in the groove it has the diameter shown in full lines in Fig. 3, and when it is seated as in Figs. 1 and 2 it has been expanded so that its diameter is as shown by the dot-and-dash lines of Fig. 3, and is in a condition of tension at all times during the normal functioning of the device.

It will be understood that there will be a space between each hook of one element and the neighboring hooks of the other element, so that there are stretches 33 of the ring that are unsupported and out of contact with the hooks of either element.

Neglecting the matter of torque stress, it is contemplated that in the normal functioning of the device, the load or shock applied to either element 25—26, will cause movement, axial in direction, relative to the other element. This will result in the exertion of compressive force by the hooks of the moving member against those portions of the face 34 or 35 of the ring that are in contact with the hooks; and simultaneously the unsupported stretches 33 of the ring will be deformed in shear. For reasons already suggested, the fatigue life of the rubber ring, the spring rate, and other qualities of the ring and of the device as a whole may be regulated and predetermined when a particular device is being designed, and having in mind also that the radial spacing of the assembled hooks, their respective area of contact with the faces 34—35 of the ring, the cross-section of the ring itself, and other factors, must be taken into account.

It must be remembered that functionally it makes little difference which of the elements 25—26 is considered to be the moving load or force applying member, and which is the relatively stationary member; they frequently exchange roles in practice. And as pointed out in my co-pending application, the ring need not be an actual circular body, but may be a loop; it may not even be circumferentially continuous, so long as it is functionally so; and, of course, I contemplate the use of any material which possesses the descriptive qualities of rubber so far as the purposes of this invention are concerned, and I include such materials within the term "rubber."

Referring to Fig. 4, I show a rubber band which is stretched between a stationary hook 36 and another hook 37 that may be moved in a direction away from 36 to put the ring under substantial tension. An element of this sort may be used in a structure such as shown in Figs. 6 and 7. In Fig. 7 there is shown a panel 38 and a surrounding frame 39, it being contemplated that these parts are in the same plane as shown in Fig. 7, though they need not necessarily be in the same plane. And these members 38 and 39 are relatively movable members corresponding to 25—26. In order to insulate 38 from 39 in case, for example, a force is applied to panel 38, to move it perpendicularly to the plane of the panel, a number of the elements shown in Fig. 4 may be utilized, each comprising a band, such as the stretched ring 40 of Fig. 4, and a means corresponding to hook 36 for fastening such member 40 to the frame 39, and another fastening means, such as a hook 37, for fastening the member 40 to the panel 38. As stated, all of the rings 40 are initially and are maintained in substantial tension regulated and controlled as the particular situation may require. Obviously, instead of a stretched ring or continuous band such as shown in Fig. 4, I might utilize a single length or strip of rubber under tension between any suitable fastening means engaging its ends and which may be moved towards and from each other to determine the tension of the rubber. In Fig. 6 there is a somewhat similar arrangement, a central disk 44 corresponding to the panel 38, and a surrounding washer-like member 45 corresponding to the frame 39; and rubber elements 40 connect the disk and the washer-like element as shown, being in substantial tension, so that if force is applied to either 44 or 45 to move it perpendicularly to the plane of the device, the several elements 40 will be deformed in shear.

In Fig. 8 there is a sort of saddle 41 provided with side grooves 41' to accommodate the intermediate portions of the courses of the stretched ring or band 40, load being applied to the saddle 41 and causing it to move as indicated by the arrows, thereby subjecting the rubber to deformation in shear, as will be obvious; saddle 41 corresponds to one of the elements 25—26, and hooks 42 are on the other of such relatively movable elements.

Fig. 9 illustrates the Fig. 8 construction in diagram, the black circles in that case representing fixed, or adjustably fixed points of support 42, and the light circle representing the saddle 41.

In Fig. 10 there is shown a stretched rubber ring or band 40 bent into angular form as shown, and there are end supports 42 carried on one relatively movable member like 25—26, but the load is applied by means of hooks 43 that engage the rubber at the apex of the angle and that are rigid with the other of the relatively movable members corresponding to 25—26, such relatively movable members not being shown; this particular form of device is to be used in multiple, as shown in Figs. 14 and 15.

Fig. 11 illustrates the Figs. 10 and 12 constructions diagrammatically.

Fig. 12 is similar to Fig. 10, but the courses of the stretched rubber band are in the same vertical planes as distinguished from the Fig. 10 arrangement, where the courses of the band are in the same horizontal plane. In this embodiment the load-applying member 44 may be a single vertical arm provided with spaced notches 45 to engage the respective courses of the stretched rubber band (see Fig. 16).

It will be obvious with respect to both the Fig. 10 and the Fig. 12 constructions that the initial and persisting tension contemplated by my invention may be put into the rubber element by simply moving the end supports 42 further apart as measured along the length of the rubber (see Fig. 18); or, the positions of the end supoprts being fixed, by changing the angle of the length of rubber by appropriate adjustment of the position of member 43 or 44 with respect to its engagement with the rubber. It is to be understood that in both cases the supports 42 are attached to one of the movable members corresponding to 25 or 26, while the members 43 or 44 are rigid with the other one of the relatively movable members corresponding to 25 or 26.

Figs. 13 and 17 illustrate in diagram the application of a plurality of Fig. 8 devices to make up a mount for a radio chassis or the like, the black circles representing points of support 42 rigid with one relatively movable element corresponding to 25 or 26, and the light circles representing points of application of load rigid with the other one of the relatively movable members corresponding to 25 or 26.

Figs. 14 and 15 illustrate in diagram arrangements similar to Fig. 13, but made up of elements like Figs. 10 or 12, and here again the black circles represent points of support rigid with one relatively movable member corresponding to 25 or 26, while the light circles represent points of application of force fixed on the other movable member corresponding to 25 or 26.

Fig. 16 illustrates in perspective an adaptation of the devices of Fig. 12, there being relatively movable members 25 and 26, one of them, 25, provided on opposite sides with notches, the notches on one side being indicated by numeral 46 and those on the opposite side by numeral 46', to accommodate the parallel courses of two rubber rings 40, (one ring at each side of the device), the ends of the rings being engaged respectively over the projections 46" or 46''' between the notches 46 and 46'; respectively; and the other movable member 26 being similarly provided with corresponding notches to accommodate the courses of the several rubber rings. Here again the rubber is under initial and kept under substantial tension.

Fig. 18 shows a modification of the Fig. 8 device, in which there is a base 47 that corresponds to one of the elements 25—26. Adjustable towards and from each other, as by means of adjusting screws 48, is a pair of blocks 49, each provided with a notch to receive a rubber ring 40. By moving the blocks 49 away from each other to the proper extent, the rubber is put under the desired tension and kept in that condition by the fixing of the adjusted position by means of the screws 48. There is a saddle 41 carried by the band which constitutes, or is attached to, the other relatively movable member corresponding to 25 or 26.

In Fig. 19 there is a base 50 carrying upstanding columnar members 51, four of them arranged in pairs, the members of a pair opposing each other as shown, and each of which members 51 is provided with a plurality of outwardly opening notches 52, and there is another columnar element 53 provided at different levels with through openings 54, successive ones of those openings extending through the piece 53 at right angles to each other. The base 50 will constitute, or be attached to, one movable element like 25 or 26, and the piece 53 will constitute, or be attached to, the other movable element corresponding to the other movable element like 25 or 26. Connection between 53 and the uprights 52 is established by means of a plurality of endless rubber bands 55, which respectively pass through the several openings in the member 53 and have their ends engaged in the corresponding notches in opposed uprights 51, each such endless band being under initial and persisting tension. It is believed that the functioning of this device will be obvious. It has advantages in places where there is ample space vertically but not laterally. And, of course, there is the cumulative effect of utilizing a plurality of the rubber elements.

In Fig. 20 there is shown a modified construction of the Fig. 4 element, one of the hooks 56 being very much wider than its complementary hook 57. The advantage here is in resistance to lateral displacement in the plane of the rubber band; and here again, as in all forms of my device, the rubber band or ring is under initial and persisting tension.

In Fig. 21 there is an illustration in diagram of the use of the Fig. 20 device, the light circles representing the hook 57, and the two black circles in each case together representing the hook 56, while the black lines represent the rubber ring 40. The general structure is like that of Fig. 7, there being a panel 38 and a surrounding frame 39, these two parts being relatively movable, and it being assumed that the load is applied to move the panel 38 perpendicularly to the plane of the panel, thereby deforming the unsupported portions of the several rubber rings 40 in shear.

In Fig. 22 there is a base corresponding to base 47 of Fig. 18, and there are end blocks 49 which in this case are shown rigid with the base, though they may be adjustable as in Fig. 18, if desired.

These blocks are provided with notches to accommodate the rubber band 40, and there is also a saddle 41 similarly provided with notches to accommodate the rubber band 40. In addition, there are blocks 58, provided with notches to accommodate the rubber band 40, and which are slidable towards and from each other on the base and which may be secured in adjusted position by means of set screws 59. These blocks 58 are two in number, and located, respectively, between the saddle 41 and the adjacent end block 49. Obviously, if the blocks 58 are moved more or less towards each other, they will determine the effective length of the rubber between them, with consequent effects on the spring rate, etc.

In Fig. 23 there is shown a device for accomplishing in a general way the results obtained by the construction of Fig. 19. There are two similar but reversely arranged interfitting members 60 and 61, generally U-shaped as shown, with the opening of the U of the one accommodated in the opening of the U of the other, one of which members 60—61 may correspond to a relatively movable member, such as 25, and the other to a relatively movable member 26. The side arms of members 60 and 61, respectively, provide a plurality of fan-shaped hook portions 62, 63, and when assembled these hook portions of the one element 60 are spaced from their neighbors of the other element 61, the whole arrangement being symmetrical, as shown. In the substantially circular grooves provided by the matching hooks of the two members are carried rubber bands 40 under tension, so that we have here the cumulative effect in a unitary structure of a plurality of rubber springs.

In Fig. 24 there is shown a central disk 44 and a surrounding washer-like member 45 which correspond to the two relatively movable members, such as 25—26. There are hooks 64 on the disk and hooks 65 on the washer, those on the disk opening inwardly towards the axis of the device, and those on the washer opening outwardly away from the axis. A single rubber band 40 is engaged with these hooks, so that hooks 64 engage the outer edge of the rubber ring while the neighboring hooks 65 on the washer engage the inner edge of the band, the band as a whole being in and kept in tension.

The design of springs of the ring-type class demands especially careful attention to details. One of the important factors is the size and proportioning of the rubber ring. The major dimensions of a circular ring are the inner and outer diameters and the thickness. The diameters may be so chosen relative to each other and to the thickness that the ring may appear to be thin or thick, as desired.

The thickness may be so chosen as to provide a thin washer-like ring or be increased to such an extent that the ring becomes in fact a length of tubing, but useful in the design of springs for special cases. For fixed diameters the load carrying capacity can be increased in direct proportion to the increase in thickness, provided the hooks are correspondingly opened to accommodate the additional thickness. As the thickness is increased with respect to the diameters certain consequences must be recognized and compensated for if necessary. In a spring employing a flat ring of rubber the deformation of the unsupported rubber between hooks is in shear for small deformations, with a tension aspect becoming apparent for larger deformations. The external load is applied to the supporting members and is transmitted to the rubber by a compressive contact between the inner flat surface of the hooks and the area of the supported portion of the ring. If the supporting area of the hooks is larger in comparison with the load, the intensity of the compression forces in the supported portion of the ring is low. Between the supported portions and the unsupported portions the stresses resulting from the applied load change from compression to shear. As in any mechanical assembly of metal or other material involving active forces capable of producing fatigue, complications of stresses are to be avoided in good design. In the ring types of spring disclosed herein the effects of stress transitions are minimized by the initial circumferential tension in the ring, which is at right angles to the shear planes, and by other controllable factors, principally the proportioning of the parts, i. e., design details. As long as the compressive stresses in the supported portion of the rubber can be kept low, there can be no serious stress complications at the boundary with the unsupported sections. However, it is conceivable that complications affecting the serviceability of a spring can occur if the distribution of compressive and shear stresses is not properly controlled. Consider a spring of the type shown in Fig. 1 having a rubber ring with definite inside and outside diameters and some known thickness $a$. If another spring is designed to employ the identical quality or kind of rubber and the same dimensions except for an increase of the axial thickness of the ring (as distinguished from its cross-axial thickness) to $2a$, the load carrying capacity of the spring based upon the thickness of the unsupported portion of the ring is doubled. Similarly springs having the same rubber compositions and dimensions except for rubber thicknesses of $4a$, $6a$, $8a$, etc., will have four, six and eight times the load-carrying capacity of the original ring having the thickness $a$. The shear stresses in the separate springs for their rated loads are the same because the load-carrying capacity is increased in proportion to the axial thickness of the rubber. On the other hand, the area of compressive contact between the surfaces of the hooks and the rubber ring is the same in all the openings, and the result is an increase in compressive stresses in the supported portion of the rubber in direct proportion to the thickness, namely, $a$, $2a$, $4a$, $6a$, and $8a$. If, however, adhesion or friction can be provided between the surface of the rubber and the supporting members, the load can be transmitted to the rubber by means supplementing the compressive contact between the hooks and the rubber. For this reason devices of the type described in my co-pending application become increasingly important for greater ring thickness (or tube length) even if the particular spring is exclusively for colinear loading as distinguished from torque loading for which the adhesion or friction requirement was first revealed.

I claim:

1. In a spring of the kind described, the combination of a pair of coaxial mounting members having radially extending arms, the arms of said members being alternately arranged in spaced relation about the common axis of the members, and a readily expansible and deformable elastic ring enlarged by stretching to substantially more than its unstressed peripheral length and in such stretched condition engaging said arms and forming a resilient connection between said members.

2. In a spring of the kind described, the combination of a pair of coaxial mounting members having matching radially extending arms alternately arranged in symmetrically and uniformly spaced relation about the common axis of the members, and a readily expansible and deformable elastic ring enlarged by stretching to more than its unstressed peripheral length, and engaging and held by the arms of said members in such stretched condition and forming a resilient connection between the members in a plane perpendicular to the common axis.

3. A flexible device of the character described, comprising a pair of substantially coaxial complemental members having arm portions in intermeshing relation with a space between each two contiguous arm portions, and a resilient loop engaging said arm portions and flexibly connecting said members so as to permit relative axial and relative tilting movements therebetween, said loop being initially and at all times in substantial tension.

4. A spring element for the purpose set forth, comprising two longitudinally stretched lengths of rubber in side-by-side position, means for maintaining said lengths in longitudinally stretched condition, and a saddle between the ends of the lengths and having a formation accommodating the lengths for transmitting load to and in a direction perpendicular thereto.

5. A spring element for the purpose set forth, comprising a length of rubber, means for stretching the rubber in the direction of its length and maintaining it in tension, a member carried by the rubber between its ends for transmitting load thereto in a direction perpendicular to its length, and means independent of the tensioning means, for regulating the effective length of the rubber.

6. A flexible device of the character described, comprising a pair of substantially coaxial complemental members each having hooks spaced around the axis, the hooks of one member being operatively disposed in the space between two of the hooks of the other member and each hook of one member spaced from the contiguous hooks of the other member, the hooks of one member opening away from the axis and those of the other opening towards the axis, and an elastic loop engaged in all of the hooks, substantially as and for the purpose set forth.

7. A device as set forth in claim 6, in which the loop is held in the hooks at all times by its own tension.

8. A spring element for the purpose set forth, comprising a longitudinally stretched length of rubber, means for maintaining said length in longitudinally stretched condition, and a member engaging the rubber between its ends for transmitting load thereto in a direction perpendicular to its length.

9. A device of the kind described, comprising two similar but reversely arranged interfitting members generally U-shaped, with the opening of the U of the one member accommodated in the opening of the U of the other, the side arms of the U-shaped members respectively providing a plurality of matching outwardly opening hook portions, the hook portions of the one member being spaced from the matching hook portions of the other member when the assembly is complete, and rubber bands under tension accommodated in the matching hook portions of the two members, substantially as set forth.

10. In a spring device having two relatively movable members and means resiliently joining them together, the improvement which comprises: said means including an elongated elastic band constantly held under tension in its major dimension, said band being attached to one of said members at at least two points along the length of the band and being attached to the other of said members at at least one intervening point along the length of the band.

11. In a spring device having two relatively movable members and means resiliently joining them together, the improvement which comprises: said means including a longitudinally stretched rubber band, and means to hold said band longitudinally stretched, said band being attached to one of said members at at least two points along the length of the band and being attached to the other of said members at at least one intervening point along the length of the band.

12. A flexible device of the character described, comprising a pair of substantially coaxial complemental members, and a peripherally-stretched continuous rubber loop flexibly connecting said members so as to permit relative axial and relative tilting movement therebetween, said members having loop-engaging portions in intermeshing relationship with a space between each two contiguous portions, said loop-engaging portions establishing a geometrical configuration for the loop and maintaining the loop in peripherally-stretched condition.

13. A flexible device of the character described, comprising a continuous elastic peripherally-stretched loop of rubber, and a pair of mounting members flexibly connected by said loop, said members having connections with said loop at substantially equally spaced points therearound, the connections of one member with said loop being in alternate relation to and spaced from the connections of the other member with the loop so as to leave deformable portions of the loop exposed between said connections, said construction maintaining the loop in peripherally-stretched condition.

14. A flexible device of the character described, comprising a pair of substantially coaxial complemental members having arm portions in inter-meshing relation with a space between each two contiguous arm portions, and a resilient peripherally-stretched loop engaging said arm portions and flexibly connecting said members so as to permit relative axial and relative tilting movements therebetween, said construction maintaining the loop in peripherally-stretched condition.

15. A flexible device of the character described, comprising a pair of substantially coaxial complemental members having hook portions in intermeshing relation with spaces between the contiguous hook portions, and an elastic peripherally-stretched loop engaging in said hook portions and forming a flexible connection between said members, said construction maintaining the loop in peripherally-stretched condition.

FELIX L. YERZLEY.

REFERENCES CITED

The following references are of record in the file of this patent:

UNITED STATES PATENTS

| Number | Name | Date |
|---|---|---|
| 1,704,570 | Lee et al. | Mar. 5, 1929 |
| 2,353,952 | Yerzley | July 18, 1944 |
| 2,353,943 | Storch | July 18, 1944 |